April 30, 1957 — C. H. HOFFMANN — 2,790,888
APPARATUS FOR HEATING AND MOISTENING AIR FOR FOOD CARTS
Filed Aug. 18, 1955

INVENTOR.
Carter H. Hoffmann
BY
Attorney

United States Patent Office 2,790,888
Patented Apr. 30, 1957

2,790,888
APPARATUS FOR HEATING AND MOISTENING AIR FOR FOOD CARTS

Carter H. Hoffmann, Chicago, Ill.

Application August 18, 1955, Serial No. 529,107

7 Claims. (Cl. 219—39)

This invention relates to food carts and particularly to an apparatus for heating and moistening air which is to be circulated through the food cart over the food disposed therein.

For reasons of sanitation and health, and also to satisfy local regulations in certain communities, it is necessary that all apparatus used in public eating places be adapted to periodic disassembly and thorough cleaning. This applies to food carts which are used to carry food from a kitchen to a remote banquet hall or dining area. Because of the distances travelled and incidental delays in loading and unloading a food cart, means are provided in such carts for heating and moistening the air therein and for moving or circulating the air throughout the compartments in such carts in which the food is stored. The heating, moistening and circulating apparatus, being disposed in apparatus for handling food, must be periodically cleaned and disinfected, particularly where the same carts are used to return the empty dishes to the kitchen after the meal has been finished.

It is an object of this invention to provide apparatus for heating, moistening and circulating air through a food cart or the like, said apparatus comprising one or more independent units which may be readily placed into and removed from a cart as such.

As another object, this invention seeks to provide apparatus for heating, moistening and circulating air through a food cart or the like, said apparatus being so disposed relative to the interior or useful load carrying area of the cart as to subtract a minimum of useful space.

Inasmuch as the moistening of the air requires a supply of water which must be frequently replenished, it is a further object of this invention to provide apparatus for heating, moistening and circulating air in a food cart or the like wherein the moisture supplying means is disposed in independent units which may be readily withdrawn from, and inserted into, the food cart without disturbing the apparatus for heating and circulating the air.

As a more specific object, this invention has within its purview the provision of a heating and circulating unit for a food cart or the like, said unit being readily removable from the cart and being so constructed as to protect all the parts thereof from falling food and other objects, but which nevertheless may be readily opened to provide access to the interior thereof.

Figure 1:
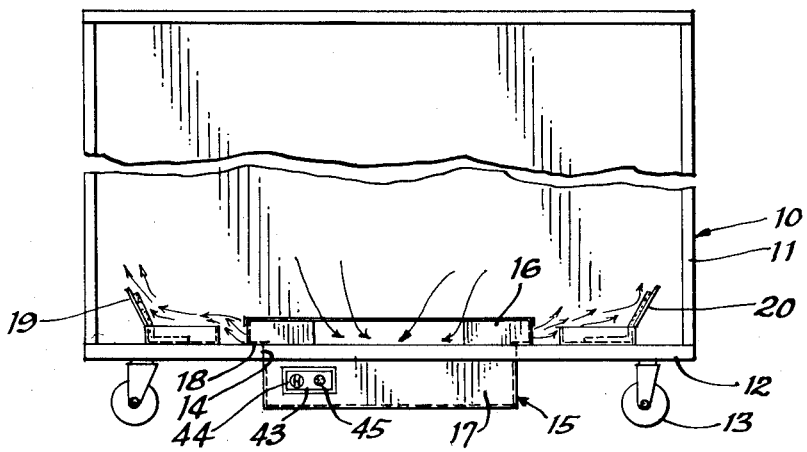
Figure 3:
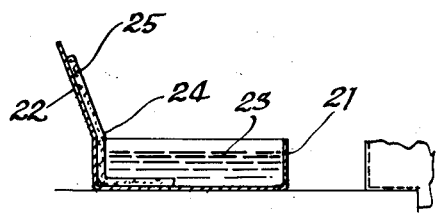
Figure 2:
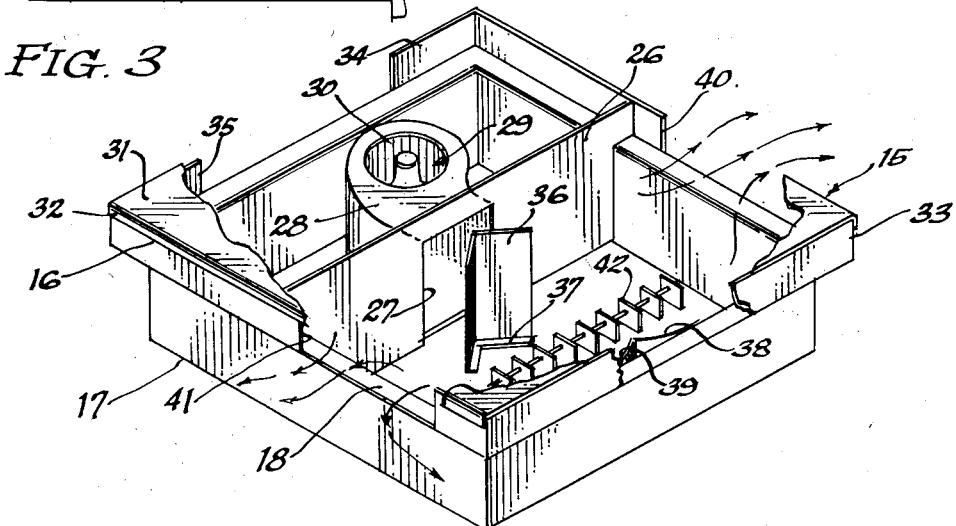

These and other objects of this invention will become apparent from the following detailed description when taken together with the accompanying drawings in which, Fig. 1 is a side elevational view of a food cart showing the manner in which the heating, moistening and circulating units of this invention are mounted therein;

Fig. 2 is a plan view in perspective of the heating and circulating unit with the cover broken away to show the interior thereof; and Fig. 3 is a side elevational view in section of a unit for moistening the heated air emanating from the heating and circulating unit.

For purposes of illustration this invention will be described with reference to its application to a food cart of the type disclosed and claimed in my copending application Serial No. 507,654, filed May 11, 1955, for Plate Carrier, but it is understood that the invention can be applied to stationary food storage chambers and in other situations requiring a circulation of heated moist air therethrough.

Referring now to the drawings for a detailed description of the invention, the cart is shown generally at 10 and may take the form disclosed in my aforementioned application. Said cart includes a frame 11 having a horizontal lower platform 12 to which wheels 13 may be affixed for readily moving the cart about, it being understood that certain of said wheels will be of a caster type to permit turning the cart around corners or objects such as counters, tables, chairs and the like. Said platform 12 has an opening 14 in the central portion thereof, said opening being substantially rectangular in outline to receive the rectangular heating and circulating unit 15. Said unit 15 is comprised of an upper section 16 and a lower section 17, the latter being of substantially the same dimensions as the dimensions of opening 14 so as to be received therein, while section 16, though of similar outline as section 17 in the present illustrative embodiment, is of greater dimension than opening 14 to provide a substantially continuous shoulder 18 which rests upon the region of platform 12 immediately adjacent opening 14 and constitutes the support for unit 15. It is contemplated that the entire unit may be removed from cart 10 merely by raising it until section 17 is clear of opening 14 and then sliding it laterally out of the cart. An appropriate door (not shown) is provided in the side of cart 10 to give access to the unit.

On either side of unit 15, and also resting upon platform 12, are the independent moistening units 19 and 20 which, for ease of manufacture, may be made identical in all respects. Said moistening units are disposed in the path of the air leaving unit 15 (as will be presently described) and, as shown in Fig. 3, each is comprised of a pan 21 having a deflector 22 secured to one side thereof and interposed in the path of movement of the air emanating from unit 15. Each pan 21 is adapted to be substantially filled with water 23 and to have immersed therein the lower ends of a plurality of wicks 24 the upper ends 25 of which rest upon deflector 22. Said wicks may take the form of rectangular pieces of fibrous material such as felt or the like, and function to draw water upwardly out of pan 21 into the air stream as it strikes deflector 22, where the air may absorb the moisture from the wick and then pass upwardly into the food chambers of the cart (not shown). The material of which the containers 21 are made is immaterial to the operation of this invention, but they are preferably made of a stainless material so as to be readily cleaned when required. The pans 21 are also readily removable from cart 10, this being done by sliding them laterally through appropriate openings in the lower part of said cart 10 adjacent platform 12 (not shown).

The heating and circulating unit is shown in greater detail in Fig. 2. Both sections 16 and 17 are divided vertically by a partition 26 extending entirely across each section and preferably made of a single sheet of metal secured by any suitable means to the side walls of the containers. Alternatively, partition 26 may be secured to the outlet or mouth 27 of a shroud 28 for a blower 29 disposed in section 17, the inlet opening 30 for the blower being exposed to the upper section 16.

The function of partition 26 is to separate the intake and outlet sides of blower 29. It is contemplated that a cover 31, having side flanges 32 and 33 will be placed over section 16 and will contact partition 26 to complete the formation of two separate chambers in unit 15. The rear wall 34 of the section 16 has an opening 35 therein through which air from the lower part of the cart may be admitted to the intake opening 30 of blower 29.

The outlet of blower 29 is divided into two streams by a deflector 36, preferably made of stainless sheet metal and having flanges 37 at the lower end thereof by which it may be spot welded or otherwise secured to the bottom of section 17. The two streams are directed against the curved walls 38 and 39 of a second deflector which, in turn, assists in directing the two streams through openings 40 and 41 in opposite side walls of section 16 from whence the streams move over the adjacent moistening units 19 and 20 and thence upwardly into the food compartments of cart as aforesaid.

Prior to striking the curved walls of the second deflector and issuing from unit 15, the two streams pass over an electrical heating unit 42 by which the temperature of the air stream is raised so that the air as it moves over the moistening units 19 and 20 will not only absorb more moisture but will also be of the proper temperature to heat the food in the cart. The precise construction of the heating unit is not material to this invention except that it must be of the type which may be readily cleaned when required.

The controls for the unit are not disclosed herein but reference may be had to my aforesaid prior application for a detailed description for a typical arrangement of controls for such a heating unit. It is contemplated, however, that the controls will terminate in a plate or panel 43 disposed in one of the sides of section 17 which will be readily accessible from below the cart when the unit is installed therein, said plate supporting or surrounding a plug receptacle 44 and a pilot light 45. The former may be connected to an electrical outlet in the room in which the cart is standing either in the kitchen or in the dining area and the pilot light indicates whether current is passing through the heating unit 42 and energizing blower 29. The connections to receptacle 44 will, of course, be broken prior to the removal of unit 15 from cart 10.

It is understood that the foregoing description is merely illustrative of preferred embodiments of this invention and that the scope of the invention therefore is not to be limited thereto but is to be determined by the appended claims.

I claim:

1. In combination with a food cart or the like having a platform and an opening in the platform, means extending through said opening for heating and circulating air through the cart, comprising a unitary container having a blower and a heating element therein, and means for removably securing the unit from the platform in such manner that a section of the container extends into the cart and a section extends below the cart, said section extending into the cart having inlet and outlet openings for the blower.

2. In combination with a food cart or the like having a platform near the bottom thereof and an opening in the platform, means extending through said opening for heating and circulating air through the cart, said means comprising a unitary container having a lower section extending through the opening in the platform and an upper section of greater width than the width of the opening such that the container is suspended in the opening from the upper section, said upper section having inlet and outlet openings for the blower.

3. The combination described in claim 2, said lower section having a contour which is substantially the same as the contour of the opening in the platform.

4. The combination as described in claim 2, and an electrical plug receptacle in the lower section for supplying electrical energy to the blower and heater, said lower section having a side wall and said receptacle being disposed in said side wall.

5. In combination with a food cart or the like having a platform near the bottom thereof, said platform having an opening, means extending through said opening for heating and circulating air through the cart, said means comprising a unitary container having a blower with inlet and outlet openings and a heating element therein, said container having a lower section of the same shape as, and of a slightly smaller size than, the opening and extending therethrough, and an upper section of the same shape as, and of a slightly greater size than, the opening, said upper section having side walls with inlet and outlet openings therein in communication with the inlet and outlet openings respectively for the blower, and a removable cover for the upper section.

6. The combination as described in claim 5, and a vertical partition extending transversely of both sections and dividing said sections into compartments for the blower and heating element respectively, said partition having an opening in communication with the outlet opening for the blower and serving to separate the inlet and outlet openings for the blower.

7. The combination as described in claim 5, a vertical partition extending transversely of both sections and dividing said sections into compartments for the blower and heating element respectively, said partition having a centrally located opening in communication with the outlet opening for the blower and serving to separate the inlet and outlet openings for the blower, said heating element being elongated in form and extending generally in a direction parallel with the partition, and a deflector, disposed in alignment with the opening in the partition and adapted to deflect the air leaving the blower over the end regions of the heating element.

References Cited in the file of this patent

UNITED STATES PATENTS

| 1,013,368 | Blomfeldt | Jan. 2, 1912 |
| 2,054,200 | Langford | Sept. 15, 1936 |
| 2,196,035 | Shaw | Apr. 2, 1940 |
| 2,309,513 | Kramer | Jan. 26, 1943 |